United States Patent
He et al.

(10) Patent No.: US 10,616,597 B2
(45) Date of Patent: *Apr. 7, 2020

(54) REFERENCE PICTURE SET MAPPING FOR STANDARD SCALABLE VIDEO CODING

(71) Applicant: Vid Scale, Inc., Wilmington, DE (US)

(72) Inventors: Yong He, San Diego, CA (US); Yan Ye, San Diego, CA (US); Yuwen He, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 74 days.

This patent is subject to a terminal disclaimer.

(21) Appl. No.: 15/900,786

(22) Filed: Feb. 20, 2018

(65) Prior Publication Data

US 2018/0184104 A1 Jun. 28, 2018

Related U.S. Application Data

(63) Continuation of application No. 14/433,493, filed as application No. PCT/US2013/063345 on Oct. 4, 2013, now Pat. No. 9,936,215.

(Continued)

(51) Int. Cl.
*H04N 19/50* (2014.01)
*H04N 19/30* (2014.01)
(Continued)

(52) U.S. Cl.
CPC .......... *H04N 19/50* (2014.11); *H04N 19/114* (2014.11); *H04N 19/12* (2014.11); *H04N 19/159* (2014.11);
(Continued)

(58) Field of Classification Search
None
See application file for complete search history.

(56) References Cited

U.S. PATENT DOCUMENTS

| 5,196,933 A | 3/1993 | Henot |
| 5,742,343 A | 4/1998 | Haskell et al. |

(Continued)

FOREIGN PATENT DOCUMENTS

| WO | WO 2013/009441 A2 | 1/2013 |
| WO | WO 2014/011595 A1 | 1/2014 |

OTHER PUBLICATIONS

Bici et al., "Description of Scalable Video Coding Technology Proposal by Nokia (Encoder Configuration 1)", Nokia, Document: JCTVC-K0040, Oct. 10-19, 2012, pp. 1-13.

(Continued)

*Primary Examiner* — Lindsay J Uhl
(74) *Attorney, Agent, or Firm* — Condo Roccia Koptiw LLP

(57) ABSTRACT

Systems, methods, and instrumentalities are disclosed for reference picture set mapping for scalable video coding. A device may receive an encoded scalable video stream comprising a base layer video stream and an enhancement layer video stream. The base layer video stream and the enhancement layer video streams may be encoded according to different video codecs. For example, the base layer video stream may be encoded according to H.264/AVC and the enhancement layer may be encoded according to HEVC. The enhancement layer video stream may include inter-layer prediction information. The inter-layer prediction information may include information relating to the base layer coding structure. The inter-layer prediction information may identify one or more reference pictures available in a base layer decoded picture buffer (DPB). A decoder may use the inter-layer prediction information to decode the enhancement layer video stream.

20 Claims, 8 Drawing Sheets

Related U.S. Application Data

(60) Provisional application No. 61/847,225, filed on Jul. 17, 2013, provisional application No. 61/709,970, filed on Oct. 4, 2012.

(51) Int. Cl.

| | |
|---|---|
| *H04N 19/114* | (2014.01) |
| *H04N 19/12* | (2014.01) |
| *H04N 19/177* | (2014.01) |
| *H04N 19/187* | (2014.01) |
| *H04N 19/573* | (2014.01) |
| *H04N 19/159* | (2014.01) |
| *H04N 19/167* | (2014.01) |
| *H04N 19/172* | (2014.01) |
| *H04N 19/184* | (2014.01) |
| *H04N 19/39* | (2014.01) |

(52) U.S. Cl.
CPC ......... *H04N 19/167* (2014.11); *H04N 19/172* (2014.11); *H04N 19/177* (2014.11); *H04N 19/184* (2014.11); *H04N 19/187* (2014.11); *H04N 19/30* (2014.11); *H04N 19/39* (2014.11); *H04N 19/573* (2014.11)

(56) References Cited

U.S. PATENT DOCUMENTS

| | | | |
|---|---|---|---|
| 7,453,938 | B2 | 11/2008 | Haskell et al. |
| 9,936,215 | B2 * | 4/2018 | He .................. H04N 19/30 |
| 2004/0252900 | A1 | 12/2004 | Bruls |
| 2008/0259796 | A1 | 10/2008 | Abousleman et al. |
| 2010/0020871 | A1 | 1/2010 | Hannuksela et al. |
| 2010/0027615 | A1 | 2/2010 | Pandit et al. |
| 2011/0122945 | A1 | 5/2011 | Li et al. |
| 2011/0216821 | A1 | 9/2011 | Kim et al. |
| 2012/0219069 | A1 | 8/2012 | Lim et al. |
| 2014/0064360 | A1 | 3/2014 | Rapaka et al. |
| 2014/0086327 | A1 * | 3/2014 | Ugur .................. H04N 19/52 375/240.16 |
| 2014/0092964 | A1 * | 4/2014 | Ugur .................. H04N 19/46 375/240.12 |
| 2014/0092977 | A1 * | 4/2014 | Lainema ............. H04N 19/30 375/240.16 |
| 2015/0326865 | A1 * | 11/2015 | Yin .................... H04N 19/46 375/240.13 |

OTHER PUBLICATIONS

Boyce et al., "Description of Low Complexity Scalable Video Coding Technology Proposal by Vidyo and Samsung", Vidyo, Inc. And Samsung Electronics Co., Ltd., Document: JCTVC-K0045, Oct. 10-19, 2012, pp. 1-26.

Boyce et al., "High Level Syntax Hooks for Future Extensions", Vidyo, Qualcomm, JCTVC-H0388, 8th Meeting: San José, CA, USA, Feb. 1-10, 2012, 6 pages.

Boyce et al., "Legacy Base Layer Codec Support in SHVC", Vidyo, Document: JCTVC-L0178, Jan. 14-23, 2013, pp. 1-6.

Boyce et al., "VPS Support for Out-of-Band Signaling and Hybrid Codec Scalability", Motorola Mobility, Document: JCTVC-K0206, Oct. 10-19, 2012, pp. 1-6.

Bross et al., "High Efficiency Video Coding (HEVC) Text Specification Draft 7", JCTVC-I1003, 9th Meeting: Geneva, CH, Apr. 27-May 7, 2012, 280 pages.

Hong et al., "Scalability Support in HEVC", Vidyo, Inc., Document: JCTVC-F290, Jul. 14-22, 2011, pp. 1-15.

International Telecommunication Union, "Series H: Audiovisual and Multimedia Systems Coding of Moving Video—Codec for Audiovisual Services AT n x 384 kbit/s", Reedition of CCITT Recommendation H.261 published in the Blue Book, Fascicle III.6, Nov. 1988, 14 pages.

ISO/IEC, "3D Video Standardization Plans", Video Subgroup, ISO/IEC JTC1/SC29/WG11 N12557, San Jose, US, Feb. 2012, 3 pages.

ISO/IEC, "Draft Use Cases for the Scalable Enhancement of HEVC", ISO/IEC JTC-1/SC29/WG11 N12782, Geneva, Switzerland, May 2012, 8 pages.

ISO/IEC, "Information Technology—Coding of Audio-Visual Objects—Part 2: Visual", ISO/IEC 14496-2:2001(E), Dec. 1, 2001, 536 pages.

ISO/IEC, "Information Technology—Coding of Moving Pictures and Associated Audio for Digital Storage Media at up to about 1.5 Mbit/s—Part 2: Video", Technical Corrigendum 3, Ref. No. ISO/IEC 11172-2:1993/Cor.3:2003(E), Nov. 1, 2003, 6 pages.

ISO/IEC, "Information Technology—Generic Coding of Moving Pictures and Associated Audio Information: Video", ISO/IEC 13818-2, Dec. 15, 2000, 220 pages.

ISO/IEC, "Joint Call for Proposals on Scalable Video Coding Extensions of High Efficiency Video Coding (HEVC)", ISO/IEC JTC1/SC29/WG11 N12957, Stockholm, Sweden, Jul. 2012, 11 pages.

ITU-T, "Series H: Audiovisual and Multimedia Systems Infrastructure of Audiovisual Services—Coding of Moving Video—Advanced Video Coding for Generic Audiovisual Services", ITU-T Recommendation H.264, Nov. 2007, 563 pages.

ITU-T, "Transmission of Non-Telephone Signals—Video Coding for Low Bit Rate Communication", ITU-T Recommendation H.263, Mar. 1996, 52 pages.

Kim et al., "HM7: High Efficiency Video Coding (HEVC) Test Model 7 Encoder Description", JCTVC-I1002, 9th Meeting: Geneva, CH, Apr. 27-May 9, 2012, 42 pages.

Luthra et al., "Requirements of the Scalable Enhancement of HEVC", ISO/IEC JTC1/SC29/WG11 N12956, Stockholm, Sweden, Jul. 2012, 12 pages.

Ohm, Jens-Rainer, "Advances in Scalable Video Coding", Proceedings of IEEE, vol. 93, No. 1, Jan. 2005, 15 pages.

\* cited by examiner

REFERENCE PICTURE SET MAPPING FOR STANDARD SCALABLE VIDEO CODING

CROSS-REFERENCE TO RELATED APPLICATIONS

This application is a continuation application of U.S. Non-Provisional application Ser. No. 14/433,493, filed Apr. 3, 2015, which is the National Stage Entry under 35 U.S.C. § 371 of Patent Cooperation Treaty Application No. PCT/US2013/063345, filed Oct. 4, 2013, which claims the benefit of U.S. Provisional Patent Application No. 61/709,970, filed Oct. 4, 2012 and U.S. Provisional Patent Application No. 61/847,225, filed Jul. 17, 2013, the contents of which are hereby incorporated by reference herein.

BACKGROUND

A video coding system may be used to compress digital video signals to reduce the storage need and/or transmission bandwidth. A video coding system may include a block-based system, a wavelet-based system, an object-based system, or the like. Block-based hybrid video coding systems may be used and deployed. Examples of block-based video coding systems include, but are not limited to inter-national video coding standards such as the MPEG1/2/4 part 2, H.264/MPEG-4 part 10 AVC and VC-1 standards.

With the growth of smart phones and tablets both in resolution and computation capability, additional video applications, such as video chat, mobile video recording and sharing, and video streaming, may require video transmission in heterogeneous environments. Heterogeneity may exist on the client and/or on the network. On the client side, the spatial resolution of the display of a client device may increase (e.g., smart phone, tablet, TV, or the like). On the network side, video may be transmitted across the Internet, WiFi networks, mobile (e.g., 3G, 4G, or the like) networks, and/or any combination thereof.

To improve the user experience and video quality of service, scalable video coding may be utilized. Scalable video coding may encode the signal once at the highest resolution and enable decoding from subsets of the streams depending on the specific rate and resolution used by an application and/or supported by a client device. The term resolution may refer to a number of video parameters, such as but not limited to, spatial resolution (e.g., picture size), temporal resolution (e.g., frame rate), and/or video quality (e.g., subjective quality such as MOS, and/or objective quality such as, but not limited to PSNR, SSIM, or VQM). Other video parameters may include chroma format (e.g., YUV420, YUV422, or YUV444), bit-depth (e.g., 8-bit video, 10-bit video, or the like), complexity, view, gamut, and aspect ratio (e.g., 16:9, 4:3, or the like). A video codec (e.g., a scalable extension of HEVC) may support spatial scalability (e.g., the scalable bitstream may include signals at more than one spatial resolution), quality scalability (e.g., the scalable bitstream may include signals at more than one quality level), and/or view scalability (e.g., the scalable bitstream may include 2D and 3D video signals).

SUMMARY

Systems, methods, and instrumentalities are disclosed for reference picture set mapping for scalable video coding. A bitstream may be received, for example, by a decoder (e.g., a processor of a decoder). The bitstream may include a base layer and an enhancement layer. The base layer and the enhancement layer may be encoded using different video codecs. For example, the base layer may be encoded according to H.264/AVC and the enhancement layer may be encoded according to HEVC. The base layer may not include reference picture set (RPS) information.

The enhancement layer may include inter-layer prediction information. The enhancement layer maybe encoded with the inter-layer prediction information by an encoder prior to being sent to the decoder. The inter-layer prediction information may be signaled via a sequence parameter set (SPS), a video parameter set (VPS), or an adaptive parameter set (APS) of the enhancement layer.

The inter-layer prediction information may include information relating to the coding structure of the base layer of the bitstream. The inter-layer prediction information may include information relating to (e.g., identify) one or more reference pictures available in a base layer decoded picture buffer (DPB). For example, the inter-layer prediction information may indicate that a base layer picture has the same temporal prediction structure as a RPS of a collocated enhancement layer picture. For example, the inter-layer prediction information may indicate that a DPB reference picture arrangement of the base layer picture may be the same as a DPB reference picture arrangement of the collocated enhancement layer picture. For example, the inter-layer prediction information may indicate that a mapped RPS of the base layer has the same temporal prediction structure as a RPS of the enhancement layer. For example, the inter-layer prediction information may indicate that a DPB reference picture arrangement of the base layer may be the same as a DPB reference picture arrangement of the enhancement layer.

The bitstream may include one or more constraints on a group of pictures (GOP) of the bitstream. A constraint may be that the base layer and the enhancement layer have the same GOP length. A constraint may be that the base layer and the enhancement layer have the same temporal prediction structure within the GOP. A constraint may be that a GOP length of the enhancement layer video stream is equal to a GOP length of the base layer video stream. A constraint may be that a GOP length of the enhancement layer may not exceed a multiple number of times (e.g., two times) the length of the GOP length of the base layer.

An enhancement layer decoder may determine the base layer coding structure without parsing the base layer video stream, for example, using the inter-layer prediction information. The enhancement layer may be decoded using the inter-layer prediction information. For example, inter-layer prediction that uses co-located base layer reference pictures and non-co-located base layer reference pictures may be performed for the enhancement layer based on the inter-layer prediction information. Decoding the enhancement layer may include temporal prediction that uses RPS based operations and inter-layer prediction that uses inter-layer prediction information.

A bitstream may be received, for example, by a decoder (e.g., a processor of a decoder). The bitstream may include a base layer and an enhancement layer. The base layer and the enhancement layer may be encoded using different video codecs. For example, the base layer may be encoded according to H.264/AVC and the enhancement layer may be encoded according to HEVC. Inter-layer prediction information for the enhancement layer may be determined using an enhancement layer decoder. For example, inter-layer prediction information may be determined by calculating a delta picture order count (POC) between a decoded base layer picture and one or more reference pictures available in a base layer DPB for the decoded base layer picture. The inter-layer prediction information may include information relating to one or more reference pictures available in a base layer decoded picture buffer (DPB).

The inter-layer prediction information may be compared with previously generated inter-layer prediction information. Reference pictures associated with the inter-layer prediction information may be reordered based on an order of reference pictures associated with the previously generated inter-layer prediction information. The enhancement layer may be decoded with the enhancement layer decoder based on the inter-layer prediction information. The base layer may be decoded with a base layer decoder.

A video sequence (e.g., a raw and/or source video sequence) may be received, for example, by an encoder. The video sequence may be encoded to generate a base layer bitstream. The video sequence may be encoded in accordance with a constraint to generate an enhancement layer bitstream. The constraint may be applied to a group of pictures (GOP) of the enhancement layer bitstream. The constraint may be that the enhancement layer bitstream has a GOP length of a base layer bitstream of the video sequence (e.g., that the enhancement layer and the base layer have the same GOP length). The constraint may be that the enhancement layer bitstream has a GOP temporal prediction structure of a base layer bitstream of the video sequence (e.g., that a temporal prediction structure of a GOP of the enhancement layer is the same as a temporal prediction structure of a GOP of the base layer). A base layer bitstream of the video sequence and the enhancement layer may be encoded according to different video codecs. For example, the base layer bitstream may be encoded according to H.264/AVC and the enhancement layer bitstream may be encoded according to HEVC. The base layer bitstream of the video sequence and the enhancement layer bitstream may be sent as a video stream.

DETAILED DESCRIPTION

Implementations described herein may utilize spatial and/or quality scalable HEVC design. Implementations described herein may be extended to other types of scalabilities.

Figure 1:
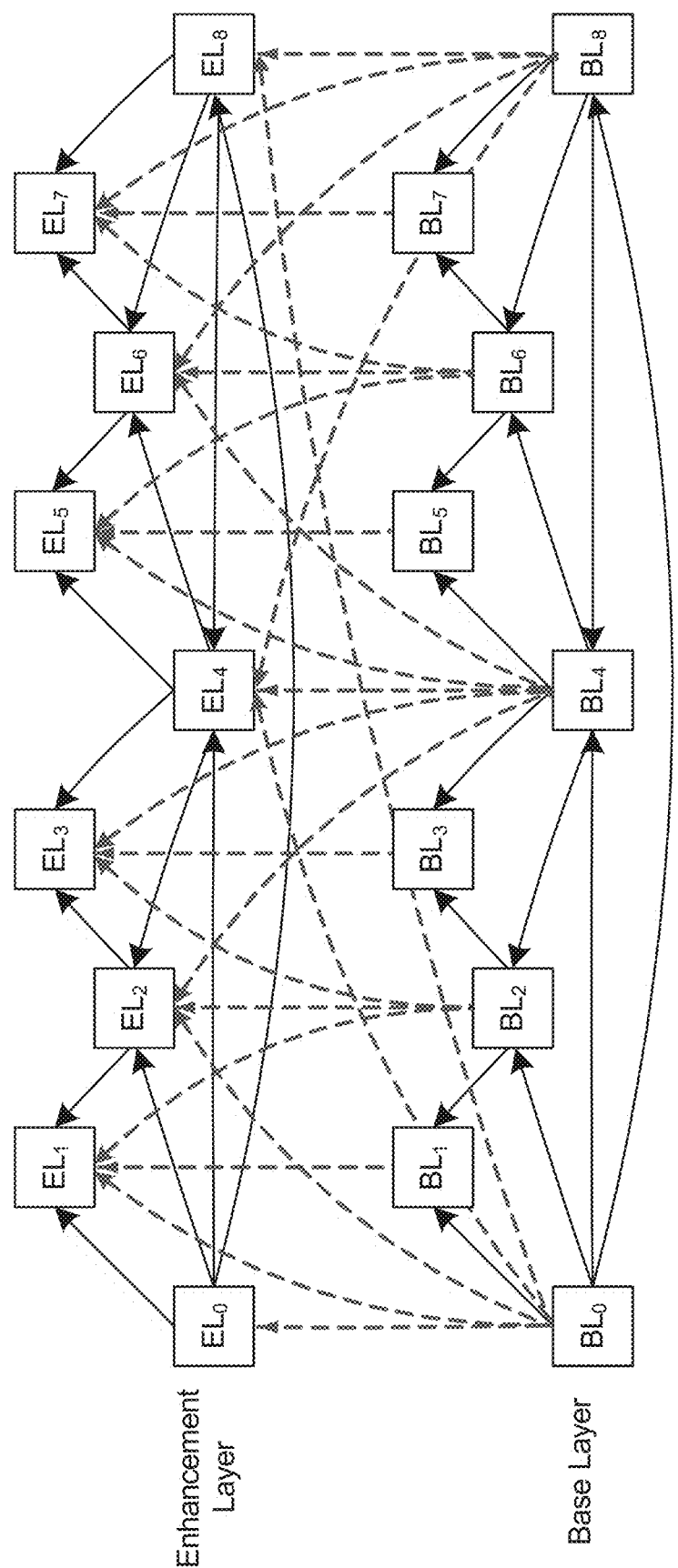
FIG. 1 is a diagram illustrating an example of a prediction structure designed for scalable coding.

FIG. 1 is a diagram illustrating an example of a prediction structure designed for scalable coding. The prediction structure of FIG. 1 may be a temporal and inter-layer prediction structure for scalable video coding. The prediction of an enhancement layer (EL) may be formed by motion-compensated prediction from inter-layer reference pictures processed from the reconstructed lower layer signal (e.g., after up-sampling the base layer picture, for example, if the spatial resolutions between the two layers are different, after denoising and/or restoration if the base layer picture quality is low, after inverse tone mapping if the base layer bit depth is lower than the enhancement layer bit depth, etc.), from temporal reference pictures within the current enhancement layer, or from a combination of more than one prediction source. Full reconstruction of the lower layer pictures may be performed. A scalable extension of HEVC may use one or more of the techniques described herein.

Coding standard scalability may be provided, for example, by a scalable extension of HEVC. Coding standard scalability may be characterized by a base layer encoded according to one video codec and an enhancement layer encoded according to another video codec. The video codecs used to encode the different layers may be different standardized video codecs, and so may be defined by different international standards specifications and/or standards bodies. A video codec may be a proprietary codec (e.g., VP7, VP8, or the like) and/or may be a standard video codec (e.g., H.264/AVC, HEVC, MPEG, etc.). For example, a base layer may be compressed in an H.264/AVC video codec and an enhancement layer(s) may be compressed in an HEVC video codec (e.g., assuming a 2-layer scalable system). A correlation of coding structure and related syntax signaling among the base layer and enhancement layer(s) may not be utilized efficiently for a scalable video coding system when standard scalability is applied, for example, due to the signaling discrepancy among different video coding standards. For example, the reference picture set (RPS) concept and signaling may be adopted by HEVC, but not adopted by H.264/AVC. A RPS may be used to convey the temporal prediction structure to the decoder. Since temporal prediction structure may remain similar among different layers, RPS may be signaled for multiple layers by exploiting inter-layer dependency.

Temporal prediction structure may refer to one or more temporal reference pictures that may be used for the coding of a current picture and/or how the one or more temporal reference pictures may be arranged in a Decoded Picture Buffer (DPB). A layer of a bitstream (e.g., a scalable bitstream) may be characterized by a temporal prediction structure. A picture of a layer of a bitstream (e.g., a scalable bitstream) may be characterized by a temporal prediction structure. A RPS of a picture of a bitstream (e.g., a scalable bitstream) may be characterized by a temporal prediction structure.

Base layer temporal prediction structure information may be extracted. Base layer temporal prediction structure information may be signaled in the enhancement layer, for example, when the scalable system operates in standard scalability mode. This may allow the scalable system to harmonize the design of RPS related signaling and operation in the enhancement layer regardless of the underlying codec that it uses in each layer (e.g., when HEVC codec is used in all layers or when H.264/AVC is used in some lower layers and HEVC is used in other layers).

RPS of a multiple layer coding scalable system may be mapped and/or signaled. HEVC may use RPS to indicate the temporal prediction structure (e.g., which pictures may be used as reference pictures for coding of the current picture and/or how to arrange the pictures in a Decoded Picture Buffer (DPB)). H.264/AVC may arrange the default reference pictures by applying a sliding window to the reference pictures available in the DPB, for example, based on their decoding and/or display orders. A DPB arrangement that is different from the default sliding window may be utilized (e.g., when the hierarchical B prediction structure may be used). H.264/AVC may utilize Memory Management Command Options (MMCO) commands to signal to the decoder that the pictures in the DPB may be re-arranged correctly. Multi-layer scalable coding may utilize the inter-layer prediction technologies, for example, due to the high correlation between base layer and enhancement layers. The similarity of prediction structures (e.g., temporal prediction structure) among different layers may not be utilized for compression because of the different syntax signaling specified by different standards. For example, a scalable system may disable inter-layer RPS prediction in the enhancement layers if and when its lower dependent layers are coded using different standards (e.g., the enhancement layer is coded using HEVC and the base layer is coded using H.264/AVC). The enhancement layer may be designed based on the coding of the base layer, for example, whether the base layer is coded using HEVC or using H.264/AVC. Mapping implementations may provide RPS like signaling for the base layer and enable inter-layer RPS prediction in the enhancement layer.

Figure 2:
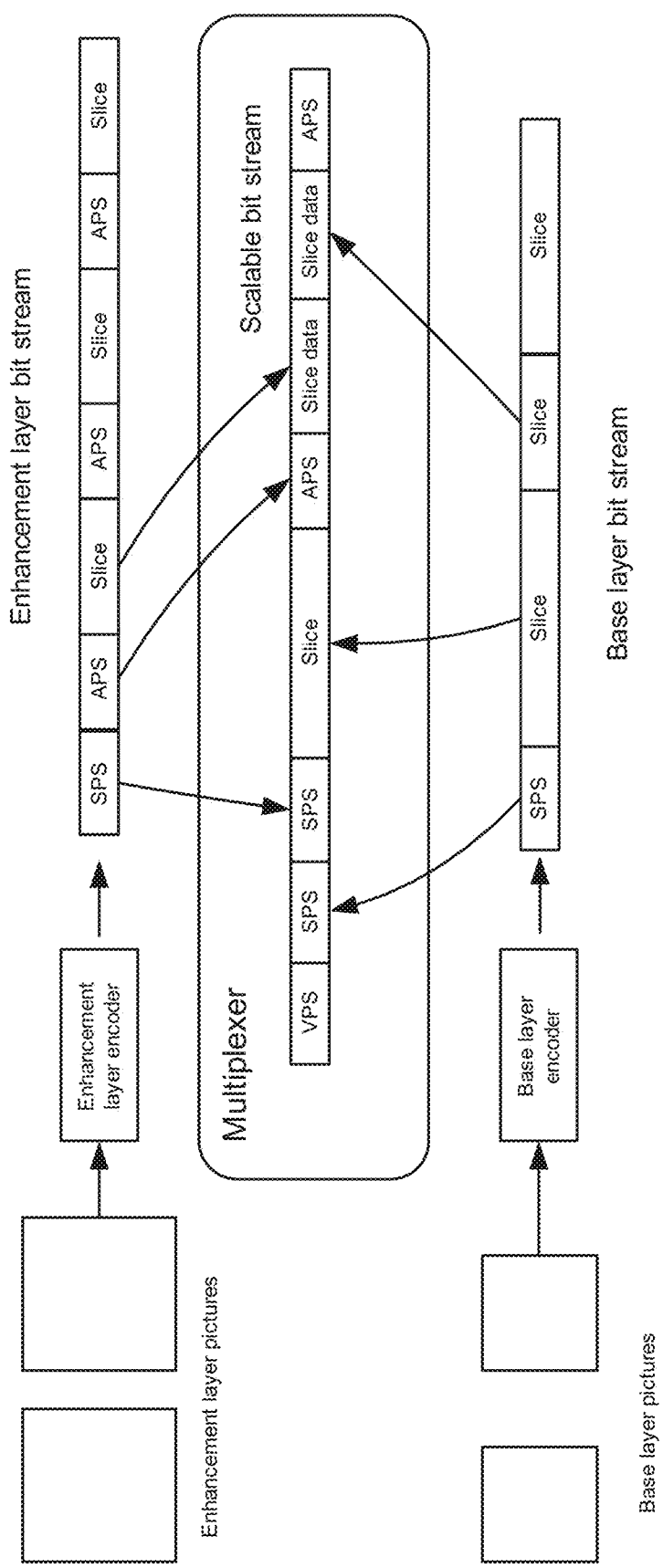
FIG. 2 is a diagram illustrating an example of a scalable system with an advanced video coding (AVC) base layer and a high efficiency video coding (HEVC) enhancement layer.

Scalable video coding may support multiple layers. Each layer may be designed to enable spatial scalability, temporal scalability, SNR scalability, and/or any other type of scalability. A scalable bitstream may include the sub-streams of one or more layers compressed using different video codecs (e.g., video coding standards). For example, the base layer may be coded according to MPEG-2 or H.264/AVC video codec, while an enhancement layer(s) may be coded according to an HEVC video codec. FIG. 2 is a diagram illustrating an example of a scalable system with an AVC base layer and a HEVC enhancement layer. The scalable bit stream of FIG. 2 may be a multiplex stream with H.264/AVC and HEVC stream interleaved.

Reference pictures may be stored in a DPB (e.g., in H.264/AVC). A reference picture may be removed from the DPB, for example, via an explicit command and/or when the DPB is full. Default reference picture lists (e.g., L0 and L1) may be constructed with the available DPB reference pictures by an increasing or decreasing order of POC. Table 1 is an example of H.264/AVC reference pictures in a DPB for a P slice with maximum DPB size 5.

TABLE 1

H.264/AVC DPB Reference Pictures Example for a P slice

| coding frame | DPB(0) | DPB(1) | DPB(2) | DPB(3) | DPB(4) |
|---|---|---|---|---|---|
| 0 | | | | | |
| 1 | 0 | | | | |
| 2 | 1 | 0 | | | |
| 3 | 2 | 1 | 0 | | |
| 4 | 3 | 2 | 1 | 0 | |
| 5 | 4 | 3 | 2 | 1 | 0 |
| 6 | 5 | 4 | 3 | 2 | 1 |

A RPS may indicate the associated reference pictures available in a DPB (e.g., in HEVC). Table 2 is an example of a RPS of a similar coding structure as exemplified in Table 1.

TABLE 2

HEVC Reference Picture List (L0) Example for a P slice with RPS

| coding frame | RPS | DPB (0) | DPB (1) | DPB (2) | DPB (3) | DPB (4) |
|---|---|---|---|---|---|---|
| 0 | | | | | | |
| 1 | (−1) | 0 | | | | |
| 2 | (−1, −2) | 1 | 0 | | | |
| 3 | (−1, −2, −3) | 2 | 1 | 0 | | |
| 4 | (−1, −2, −3, −4) | 3 | 2 | 1 | 0 | |
| 5 | (−1, −2, −3, −4, −5) | 4 | 3 | 2 | 1 | 0 |
| 6 | (−1, −2, −3, −4, −5) | 5 | 4 | 3 | 2 | 1 |

A RPS may provide signaling to identify associated reference pictures available in a DPB. For example, a video codec (e.g., H.264) may not include RPS to indicate associated reference pictures available in a DPB. Reference picture list modification signaling used to re-arrange the DPB reference pictures may be used (e.g., by HEVC), for example, instead of the Memory Management Command Options (MMCO) (e.g., as specified in H.264/AVC).

To facilitate inter-layer motion compensated prediction, the enhancement layer may be aware of the reference pictures available in base layer DPB, for example, so that it may use co-located and/or non-co-located base layer reference pictures for inter-layer prediction. An HEVC enhancement layer may identify inter-layer reference pictures by parsing the HEVC base layer RPS signal, for example, for HEVC scalable coding. The H264/AVC base layer of the coding standard scalability may not provide RPS signaling. A discrepancy may result from the use of different coding standards.

An enhancement layer codec capable of parsing a H.264/AVC bit stream syntax and support H.264/AVC MMCO operation may be provided. Such a codec may enable the enhancement layer to determine the base layer coding structure and identify the base layer DPB reference pictures.

The enhancement layer bitstream may include inter-layer prediction information. Inter-layer prediction information may include information relating to the base layer coding structure. For example, the inter-layer prediction information may identify one or more reference pictures available in a base layer decoded picture buffer (DPB) (e.g., all reference pictures available in the base layer DPB). The inter-layer prediction information may identify the ordering and/or the positions of one or more pictures within the base layer DPB. The inter-layer prediction information may include a mapped RPS (e.g., as described herein). The inter-layer prediction information may indicate that the base layer coding structure is the same as the enhancement layer coding structure (e.g., via an indicator). For example, the inter-layer prediction information may indicate that the base layer temporal prediction structure is the same as the enhancement layer temporal prediction structure. The inter-layer prediction information may indicate that a base layer picture has a reference picture set (RPS) temporal prediction structure of a collocated enhancement layer picture. For example, the inter-layer prediction information may indicate that a RPS of a base layer picture has the same temporal prediction structure as a RPS of a collocated enhancement layer picture.

The inter-layer prediction information may be determined by an enhancement layer decoder. The inter-layer prediction information may be included in an enhancement layer of a scalable bitstream and/or sent to a decoder (e.g., an enhancement layer decoder). The inter-layer prediction information may be signaled in an enhancement layer of a bitstream in a Sequence parameter Set (SPS), Video Parameter Set (VPS), Picture Parameter Set (PPS), or the like. The inter-layer prediction information may be determined (e.g., generated) by an enhancement layer decoder upon receiving a scalable bitstream.

Inter-layer prediction information may be extracted and/or mapped to a RPS signal to an enhancement layer. This may enable the base layer (e.g., the base layer coding structure) to be transparent to the enhancement layer and/or allow the enhancement layer to maintain it RPS based operation for temporal and/or inter-layer prediction. Although a coding standard scalability with H.264/AVC base layer and HEVC enhancement layer may be described herein, the concepts may apply to a base layer and/or an enhancement layer coded by other video coding standards (e.g., MPEG2, VP8, or the like).

The base layer reference picture structure may be analyzed. A corresponding RPS for enhancement layer prediction may be generated. For example, inter-layer prediction information for an enhancement layer (e.g., a picture of the enhancement layer) may be generated based on the base layer (e.g., a collocated picture of the base layer).

A mapped RPS may be generated at the encoder side. The mapped RPS may describe the coding structure of the base layer and/or the temporal prediction structure of the base layer. The mapped RPS may indicate the pictures available in a base layer DPB. The mapped RPS may be signaled in a bitstream that may be transmitted to a decoder. This may not require extra operation on the decoder side. The encoder may be aware of the coding structure of the base layer (e.g., H.264/AVC base layer) before encoding. The coding structure (e.g., H.264/AVC coding structure) may be used to determine a RPS format (e.g., a RPS-like format) for the enhancement layer (e.g., a picture of the enhancement layer). For example, the coding structure may be used to determine a RPS format by calculating the difference between a POC number of a coding picture and its associated reference pictures. The mapped RPS may be for the enhancement layer and determined from the base layer of the bitstream. The mapped RPS may be signaled in the enhancement layer of the bitstream. For example, the mapped RIPS may be signaled in the Sequence parameter Set (SPS), Video Parameter Set (VPS), Picture Parameter Set (PPS), or the like. The inter-layer prediction information may include a mapped RPS.

Table 3 illustrates an example of mapped RPS based on the delta POC calculated. The mapped RPS may be signaled in the Sequence parameter Set (SPS), Video Parameter Set (VPS), Picture Parameter Set (PPS), or the like. For example, a RPS referenced by base layer picture(s) may be signaled in the Adaptive Parameter Set (APS) of an enhancement layer. The enhancement decoder may identify the available base layer coding structure and/or the reference pictures associated with the base layer pictures, for example, without parsing the base layer stream (e.g., a single bit of the base layer stream). The encoder may generate a mapped RPS based on the updated DPB status, for example, if the reference pictures are re-arranged in the base layer DPB by the MMCO operation. The mapped RPS may be signaled in the enhancement APS, for example, so that the enhancement layer may be aware of the base layer DPB status without parsing the MMCO signaling.

TABLE 3

Example of Generating Mapped RPS from H.264/AVC DPB Reference Pictures

| coding frame | DPB reference picture (POC) | delta_POC | i | Mapped RPS sets mapped_RPS[i] | reference picture list mapping index |
|---|---|---|---|---|---|
| 0 | — | — | — | — | — |
| 1 | 0 | −1 | 0 | (−1) | 0 |
| 2 | 0, 1 | −2, −1 | 1 | (−1, −2) | 1 |
| 3 | 0, 1, 2 | −3, −2, −1 | 2 | (−1, −2, −3) | 2 |
| 4 | 0, 1, 2, 3 | −4, −3, −2, −1 | 3 | (−1, −2, −3, −4) | 3 |
| 5 | 0, 1, 2, 3, 4 | −5, −4, −3, −2, −1 | 4 | (−1, −2, −3, −4, −5) | 4 |
| 6 | 1, 2, 3, 4, 5 | −5, −4, −3, −2, −1 | | | 4 |

The mapped RPS may be determined (e.g., generated) at the decoder side, for example, by an enhancement layer decoder. Determining the mapped RPS at the decoder side may not increase any overhead bit(s). Determining the mapped RPS at the decoder side may utilize additional decoder operation to generate the mapped RPS. For example, an enhancement layer decoder may generate the mapped RPS by calculating a delta POC between the decoded base layer picture and the reference picture(s) available in the base layer DPB. The generated mapped RPS may be compared with a previously generated mapped RPS. A mapped RPS (e.g., a unique mapped RPS) may be recorded in the mapped RPS sets. One or more pictures may be analyzed to determine the mapped RPS. The number of pictures may depend on the length of a group of picture (GOP). For example, in the base layer, DPB reference pictures may be re-arranged (e.g., using H.264/AVC MMCO commands). A mapped RPS may be recorded by the enhancement layer decoder. The base layer picture(s) may reference an RPS index so that the enhancement layer may identify the associated reference pictures available in the base layer DPB.

To save overhead, an indicator may be signaled in the SPS, VPS, PPS, and/or APS to specify whether the mapped RPS sets may be identical to the RPS of the enhancement layer (e.g., HEVC enhancement layer). An indicator may be signaled in the SPS, VPS, PPS, and/or APS to specify that a temporal prediction structure of the enhancement layer is the same as a temporal prediction structure of the base layer. If an indicator is set, the mapped RPS may not be signaled. This may save an overhead bit(s).

The SPS may include coding parameters (e.g., resolution, profile, level, etc.) applied to a sequence of a bitstream. The SPS signal may be provided once for a whole sequence. The VPS may accommodate the scalable video coding scenarios where the parameters shared by multiple coding layers may be included in the VPS to help a middle box (e.g., router, gateway, eNodeB, or the like) to extract information. The VPS may be provided once for the whole scalable stream. The APS may include coding parameters applied to a picture. The APS may be provided once per picture.

An enhancement layer (e.g., HEVC enhancement layer) may include its RPS signaling in a SPS to indicate enhancement layer coding structure and/or DPB reference picture arrangement. The base layer and the enhancement layer may share the same coding structure. A coding structure may refer to a temporal prediction structure. For example, the same coding structure may refer to the same temporal prediction structure. The base layer and the enhancement layer may share the same DPB reference picture arrangement. The mapped RPS from the base layer (e.g., H.264/AVC base layer) may be identical to the RPS signaled in the enhancement layer (e.g., HEVC enhancement layer). An indicator (e.g., 1 bit) may be added in the SPS and/or VPS to indicate if the base layer mapped RPS is identical to the enhancement RPS. For example, the indicator may be used instead of spending overhead bits to signal the mapped RPS. For example, the enhancement layer may infer the mapped RPS from its own RPS for the sequence if the indicator flag is set.

Figure 3:
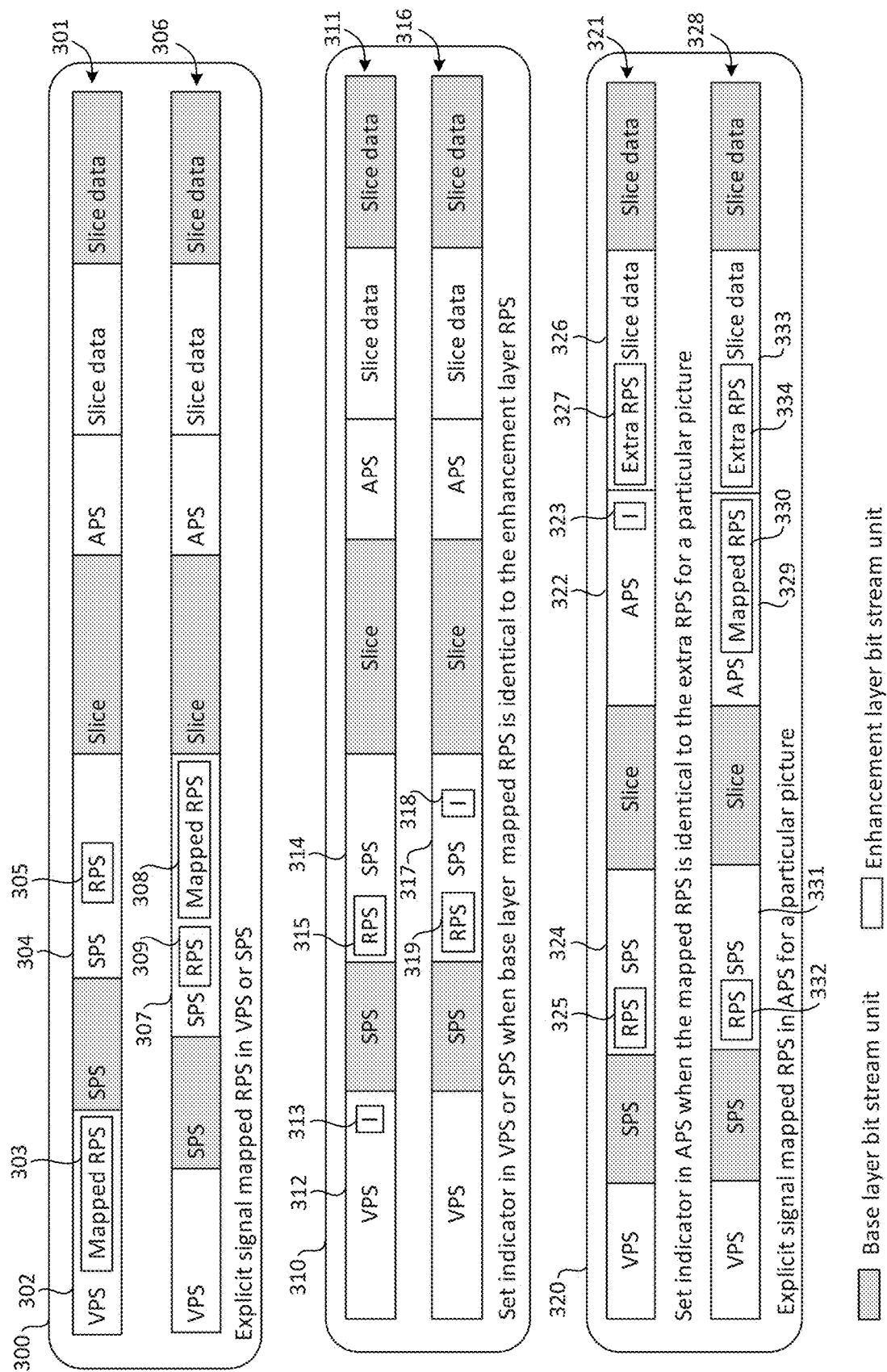
FIG. 3 is a diagram illustrating example signaling of a mapped reference picture set (RPS).

When a mapped RPS is generated based on the base layer DPB re-arrangement at a picture with the MMCO command, such mapped RPS may apply (e.g., only apply) to a picture instead of the whole sequence. The enhancement layer may perform the same DPB re-arrangement for the picture. The extra RPS may be signaled in an enhancement slice header. An indicator may be signaled in the enhancement layer APS to indicate that the mapped RPS from the base layer picture may be identical to the RPS signaled in the enhancement layer picture slice header, FIG. 3 is a diagram illustrating example signaling for a mapped RPS. The mapped RPS may describe the coding structure of the base layer and/or the temporal prediction structure of the base layer. A mapped RPS may be signaled in an enhancement layer VPS and/or an enhancement layer SPS, for example, as shown in diagram 300. An enhancement layer VPS 302 of a bitstream 301 may include signaling (e.g., explicit signaling) relating to a mapped RPS 303. An enhancement layer SPS 304 of the bitstream 301 may include signaling (e.g., explicit signaling) relating to a RPS 305, which may describe the enhancement layer. An enhancement layer SPS 307 of a bitstream 306 may include signaling (e.g., explicit signaling) relating to a mapped RPS 308 and signaling (e.g., explicit signaling) relating to a RPS 309 that may describe the enhancement layer.

An indicator may be signaled in a VPS and/or an enhancement layer SPS, for example, as shown in diagram 310. The indicator may indicate that the mapped RPS from the base layer may be identical to the enhancement layer RPS. An enhancement layer VPS 312 of a bitstream 311 may include an indicator 313 which indicates that the mapped RPS of the base layer is identical to an RPS 315 of the enhancement layer. The RPS 315 may be signaled (e.g., explicitly signaled) in the enhancement layer SPS 314 of the bitstream 311. An enhancement layer SPS 317 of a bitstream 316 may include an indicator 318 which may indicate that the mapped RPS of the base layer is identical to an RPS 319 of the enhancement layer. The RPS 319 may be signaled (e.g., explicitly signaled) in the enhancement layer SPS 317. The use of an indicator (e.g., indicator 313, 318, or the like) may obviate the need to signal (e.g., explicitly signal) the mapped RPS (e.g., as described with reference to diagram 300).

An indicator may be signaled in an enhancement layer APS, for example, as shown in diagram 320. The indicator may indicate that a mapped RPS from the base layer may be the same as the enhancement layer RPS. For example, the indicator may indicate that a mapped RPS from the base layer is the same as an RPS signaled in a SPS of the enhancement layer. The indicator may indicate an RPS on a picture basis. For example, the indicator may indicate that a mapped RPS from a base layer picture may be the same as an extra RPS signaled in a slice header of an enhancement layer picture. If the slice header of an enhancement layer picture includes an extra RPS, then the indicator may indicate that a mapped RPS from a base layer picture is the same as the RPS of an enhancement layer picture. If the enhancement layer does not include an extra RPS signaled in a slice header of an enhancement layer picture but does include an RPS signaled in an SPS of the enhancement layer, then the indicator may indicate that a mapped RPS from a base layer sequence is the same as the RPS of the enhancement layer SPS. For example, an enhancement layer APS 322 of a bitstream 321 may include an indicator 323 which may indicate that a mapped RPS of the base layer may be identical to an extra RPS 327 of the enhancement layer and/or identical to an RPS 325 of an enhancement layer SPS 324.

An enhancement layer APS 329 of a bitstream 328 may include signaling (e.g., explicit signaling) relating to a mapped RPS 330. The mapped RPS may describe the coding structure of the base layer and/or the temporal prediction structure of the base layer. An enhancement layer SPS 331 of the bitstream 328 may include signaling (e.g., explicit signaling) relating to a RPS 332 of the enhancement layer and/or the slice header 333 of an enhancement layer picture may include signaling (e.g., explicit signaling) relating to an extra RPS 334 of the enhancement layer.

Inter-layer prediction information may refer to a mapped RPS and/or an indicator. A mapped RPS (e.g., a signaled mapped RPS 303, 308, 330, a mapped RPS indicated via an indicator 313, 318, 323, or a mapped RS otherwise conveyed in a bitstream or derived by a decoded) may indicate the base layer coding structure. For example, the mapped RPS may indicate a reference picture set of the base layer. The mapped RPS may indicate a RPS of the base layer that has the same temporal prediction structure as a RPS of the enhancement layer (e.g., RPS 305, 309, 315, 319, 325, 332, or the like). A RPS (e.g., RPS 305, 309, 315, 319, 325, 332, or the like) may indicate a reference picture set for the enhancement layer of the bitstream (e.g., for HEVC). An extra RPS (e.g., extra RPS 327, 334, or the like) may indicate a RPS that is not indicated by the RPS (e.g., RPS 305, 309, 315, 319, 325, 332, or the like) for the enhancement layer coding structure.

With mapped RPS signaling, the enhancement layer (e.g., HEVC enhancement layer) RPS related operation may be harmonized for base layers that use different coding standards. Various inter-layer prediction signaling and implementations may be extended to various coding standard scalability scenarios.

RPS signaling (e.g., in a SPS) may be used to indicate the GOP structure, for example, because two or more RPSs may be used to indicate the GOP coding structure, which may include the temporal prediction structure and/or the relative reference pictures. Video codecs, such as AVC, may not support RPS. AVC may not include an indication signaled in the high level syntax. The GOP coding structure may be obtained after decoding a GOP. The GOP structure between a base layer and an enhancement layer(s) may be different, for example, for standard scalability with an AVC base layer. A GOP based decoding and memory allocation (e.g., extra memory allocation) may be utilized.

A constraint may be placed on the multiple layer coding system, for example, to simplify the decoding process and/or to avoid the need for large memory allocation. A constraint may refer to a limitation placed on the coding of a bitstream.

For example, a constraint, which may be placed on one or more layers (e.g., all layers) in a multi-layer coding system, may be that the same GOP length and/or temporal prediction structure be used within the GOP. A constraint may be that the GOP of two or more layers of a bitstream (e.g., all layers of the bitstream) are characterized by (e.g., have) the same length and/or temporal prediction structure. As such, the pictures sharing the same output time may be decoded consecutively. A constraint may be that the enhancement layer has a GOP length of the base layer. For example, a constraint may be that a GOP length of the enhancement layer is the same as a GOP length of the base layer. A constraint may be that the enhancement layer has a GOP temporal prediction structure of the base layer. For example, a constraint may be that a temporal prediction structure within a GOP of a base layer is the same as a temporal prediction structure within a GOP of an enhancement layer.

A constraint may be that the GOP length of the enhancement layer be equal to or larger than the GOP length of the base layer. The constraint may include that the GOP length of the enhancement layer may not exceed N multiple of the base layer GOP length, where N may be a positive integer number. For example, N may be set to two. As such, the maximum amount of memory allocated for the GOP based decoding process may be limited.

A bitstream may be received, for example, by a decoder (e.g., a processor of a decoder) The bitstream may include a base layer and an enhancement layer. The base layer and the enhancement layer may be encoded using different video codecs. For example, the base layer may be encoded according to H.264/AVC and the enhancement layer may be encoded according to HEVC. The base layer may not include reference picture set (RPS) information, for example, if the base layer is encoded according to H.264/AVC.

The enhancement layer may include inter-layer prediction information. The enhancement layer maybe encoded with the inter-layer prediction information by an encoder prior to being sent to the decoder. The inter-layer prediction information may be signaled via a sequence parameter set (SPS), a video parameter set (VPS), or an adaptive parameter set (APS) of the enhancement layer.

The inter-layer prediction information may include information relating to one or more reference pictures available in a base layer decoded picture buffer (DPB). For example, the inter-layer prediction information may indicate that a base layer picture has the same temporal prediction structure as a RPS of a collocated enhancement layer picture. For example, the inter-layer prediction information may indicate that a DPB reference picture arrangement of the base layer picture may be the same as a DPB reference picture arrangement of the collocated enhancement layer picture. For example, the inter-layer prediction information may indicate that a mapped RPS of the base layer has the same temporal prediction structure as a RPS of the enhancement layer. For example, the inter-layer prediction information may indicate that a DPB reference picture arrangement of the base layer may be the same as a DPB reference picture arrangement of the enhancement layer.

The bitstream may include one or more constraints on a group of pictures (GOP) of the bitstream. For example, a constraint may be that the base layer and the enhancement layer have the same GOP length. For example, a constraint may be that the base layer and the enhancement layer have the same temporal prediction structure within the GOP. For example, a constraint may be that a GOP length of the enhancement layer video stream is equal to a GOP length of the base layer video stream. For example, a constraint may be that a GOP length of the enhancement layer may not exceed a multiple number of times (e.g., two times) the length of the GOP length of the base layer.

An enhancement layer decoder may determine the base layer coding structure without parsing the base layer video stream, for example, using the inter-layer prediction information. The enhancement layer may be decoded using the inter-layer prediction information. For example, inter-layer prediction that uses co-located base layer reference pictures and non-co-located base layer reference pictures may be performed for the enhancement layer based on the inter-layer prediction information. Decoding the enhancement layer may include temporal prediction that uses RPS based operations and inter-layer prediction that uses inter-layer prediction information.

Inter-layer prediction information for the enhancement layer may be determined using an enhancement layer decoder. For example, inter-layer prediction information may be determined by calculating a delta picture order count (POC) between a decoded base layer picture and one or more reference pictures available in a base layer DPB for the decoded base layer picture. The inter-layer prediction information may include information relating to one or more reference pictures available in a base layer decoded picture buffer (DPB).

The inter-layer prediction information may be compared with previously generated inter-layer prediction information. Reference pictures associated with the inter-layer prediction information may be reordered based on an order of reference pictures associated with the previously generated inter-layer prediction information. The enhancement layer may be decoded with the enhancement layer decoder based on the inter-layer prediction information. The base layer may be decoded with a base layer decoder.

A video sequence may be received, for example, by an encoder. For example, the video sequence may be a raw and/or source video sequence. The video sequence may be encoded to generate a base layer bitstream. The video sequence may be encoded in accordance with a constraint to generate an enhancement layer bitstream. The encoding of the base layer bitstream and or the enhancement layer bitstream may be performed in accordance with the constraint. The base layer bitstream may include inter-layer prediction information.

The constraint may be applied to a group of pictures (GOP) of the enhancement layer bitstream. The constraint may be that the enhancement layer bitstream has a GOP length of a base layer bitstream of the video sequence. For example, the constraint may be that the enhancement layer and the base layer have the same GOP length. The constraint may be that the enhancement layer bitstream has a GOP temporal prediction structure of a base layer bitstream of the video sequence. For example, the constraint may be that a temporal prediction structure of a GOP of the enhancement layer is the same as a temporal prediction structure of a GOP of the base layer.

A base layer bitstream of the video sequence and the enhancement layer may be encoded according to different video codecs. For example, the base layer bitstream may be encoded according to H.264/AVC and the enhancement layer bitstream may be encoded according to HEVC. The base layer bitstream and the enhancement layer bitstream may be sent as a video stream. For example, the base layer bitstream and the enhancement layer bitstream may be encoded as a video stream and sent to a decoded.

Figure 4A:
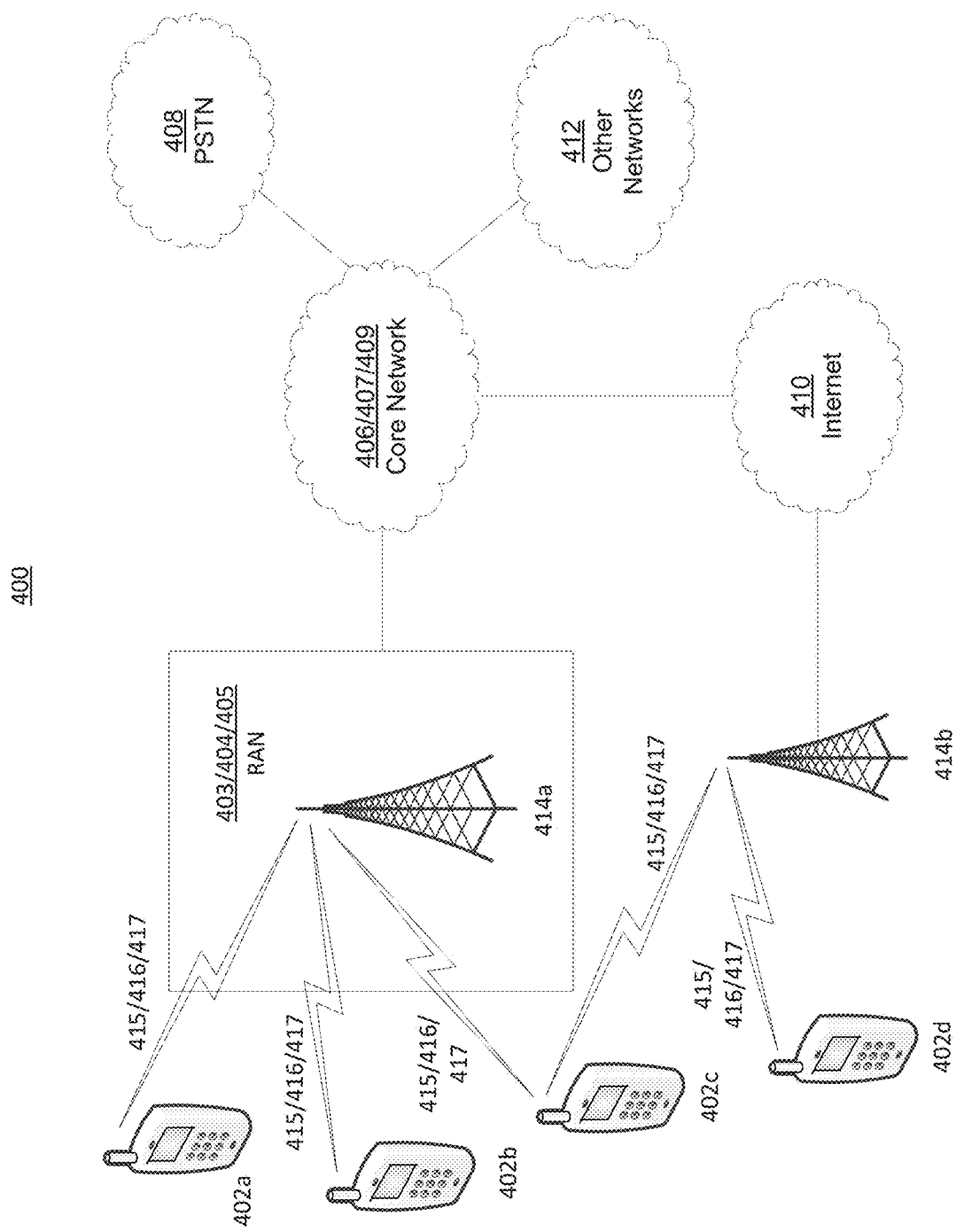
FIG. 4A is a system diagram of an example communications system in which one or more disclosed embodiments may be implemented.

FIG. 4A is a diagram of an example communications system 400 in which one or more disclosed embodiments may be implemented. The communications system 400 may be a multiple access system that provides content, such as voice, data, video, messaging, broadcast, etc., to multiple wireless users. The communications system 400 may enable multiple wireless users to access such content through the sharing of system resources, including wireless bandwidth. For example, the communications systems 400 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 4A, the communications system 400 may include wireless transmit/receive units (WTRUs) 402a, 402b, 402c, 402d, a radio access network (RAN) 403/404/405, a core network 406/407/409, a public switched telephone network (PSTN) 408, the Internet 410, and other networks 412, though it will be appreciated that the disclosed embodiments contemplate any number of WTRUs, base stations, networks, and/or network elements. Each of the WTRUs 402a, 402b, 402c, 402d may be any type of device configured to operate and/or communicate in a wireless environment. By way of example, the WTRUs 402a, 402b, 402c, 402d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, or any other terminal capable of receiving and processing compressed video communications.

The communications systems 400 may also include a base station 414a and a base station 414b. Each of the base stations 414a, 414b may be any type of device configured to wirelessly interface with at least one of the WTRUs 402a, 402b, 402c, 402d to facilitate access to one or more communication networks, such as the core network 406/407/409, the Internet 410, and/or the networks 412. By way of example, the base stations 414a, 414b may be a base transceiver station (BTS), a Node-B, an eNode B, a Home Node B, a Home eNode B, a site controller, an access point (AP), a wireless router, and the like. While the base stations 414a, 414b are each depicted as a single element, it will be appreciated that the base stations 414a, 414b may include any number of interconnected base stations and/or network elements.

The base station 414a may be part of the RAN 403/404/405, which may also include other base stations and/or network elements (not shown), such as a base station controller (BSC), a radio network controller (RNC), relay nodes, etc. The base station 414a and/or the base station 414b may be configured to transmit and/or receive wireless signals within a particular geographic region, which may be referred to as a cell (not shown). The cell may further be divided into cell sectors. For example, the cell associated with the base station 414a may be divided into three sectors. Thus, in one embodiment, the base station 414a may include three transceivers, e.g., one for each sector of the cell. In another embodiment, the base station 414a may employ multiple-input multiple output (MIMO) technology and, therefore, may utilize multiple transceivers for each sector of the cell.

The base stations 414a, 414b may communicate with one or more of the WTRUs 402a, 402b, 402c, 402d over an air interface 415/416/417, which may be any suitable wireless communication link (e.g., radio frequency (RF), microwave, infrared (I), ultraviolet (UV), visible light, etc.). The air interface 415/416/417 may be established using any suitable radio access technology (RAT).

More specifically, as noted above, the communications system 400 may be a multiple access system and may employ one or more channel access schemes, such as CDMA, TDMA, FDMA, OFDMA, SC-FDMA, and the like. For example, the base station 414a in the RAN 403/404/405 and the WTRUs 402a, 402b, 402c may implement a radio technology such as Universal Mobile Telecommunications System (UNITS) Terrestrial Radio Access (UTRA), which may establish the air interface 415/416/417 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 414a and the WTRUs 402a, 402b, 402c may implement a radio technology such as Evolved UMTS Terrestrial Radio Access (E-UTRA), which may establish the air interface 415/416/417 using Long Term Evolution (LTE) and/or LTE-Advanced (LTE-A).

In other embodiments, the base station 414a and the WTRUs 402a, 402b, 402c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 414b in FIG. 4A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 414b and the WTRUs 402c, 402d may implement a radio technology such as IEEE 802.11 to establish a wireless local area network (WLAN). In another embodiment, the base station 414b and the WTRUs 402c, 402d may implement a radio technology such as IEEE 802.15 to establish a wireless personal area network (WPAN). In yet another embodiment, the base station 414b and the WTRUs 402c, 402d may utilize a cellular-based RAT (e.g., WCDMA, CDMA2000, GSM, LTE, LTE-A, etc.) to establish a picocell or femtocell. As shown in FIG. 4A, the base station 414b may have a direct connection to the Internet 410. Thus, the base station 414b may not be required to access the Internet 410 via the core network 406/407/409.

The RAN 403/404/405 may be in communication with the core network 406, which may be any type of network configured to provide voice, data, applications, and/or voice over internet protocol (VoIP) services to one or more of the WTRUs 402a, 402b, 402c, 402d. For example, the core network 406/407/409 may provide call control, billing services, mobile location-based services, pre-paid calling, Internet connectivity, video distribution, etc., and/or perform high-level security functions, such as user authentication. Although not shown in FIG. 4A, it will be appreciated that the RAN 403/404/405 and/or the core network 406/407/409 may be in direct or indirect communication with other RANs that employ the same RAT as the RAN 403/404/405 or a different RAT. For example, in addition to being connected to the RAN 403/404/405, which may be utilizing an E-UTRA radio technology, the core network 406/407/409 may also be in communication with another RAN (not shown) employing a GSM radio technology.

The core network 406/407/409 may also serve as a gateway for the WTRUs 402a, 402b, 402c, 402d to access the PSTN 408, the Internet 410, and/or other networks 412. The PSTN 408 may include circuit-switched telephone networks that provide plain old telephone service (POTS). The internet 410 may include a global system of interconnected computer networks and devices that use common communication protocols, such as the transmission control protocol (TCP), user datagram protocol (UDP) and the Internet protocol (IP) in the TCP/IP internet protocol suite. The networks 412 may include wired or wireless communications networks owned and/or operated by other service providers. For example, the networks 412 may include another core network connected to one or more RANs, which may employ the same RAT as the RAN 403/704/405 or a different RAT.

Some or all of the WTRUs 402a, 402b, 402c, 402d in the communications system 400 may include multi-mode capabilities, e.g., the WTRUs 402a, 402b, 402c, 402d may include multiple transceivers for communicating with different wireless networks over different wireless links. For example, the WTRU 402c shown in FIG. 4A may be configured to communicate with the base station 414a, which may employ a cellular-based radio technology, and with the base station 414b, which may employ an IEEE 802 radio technology.

Figure 4B:
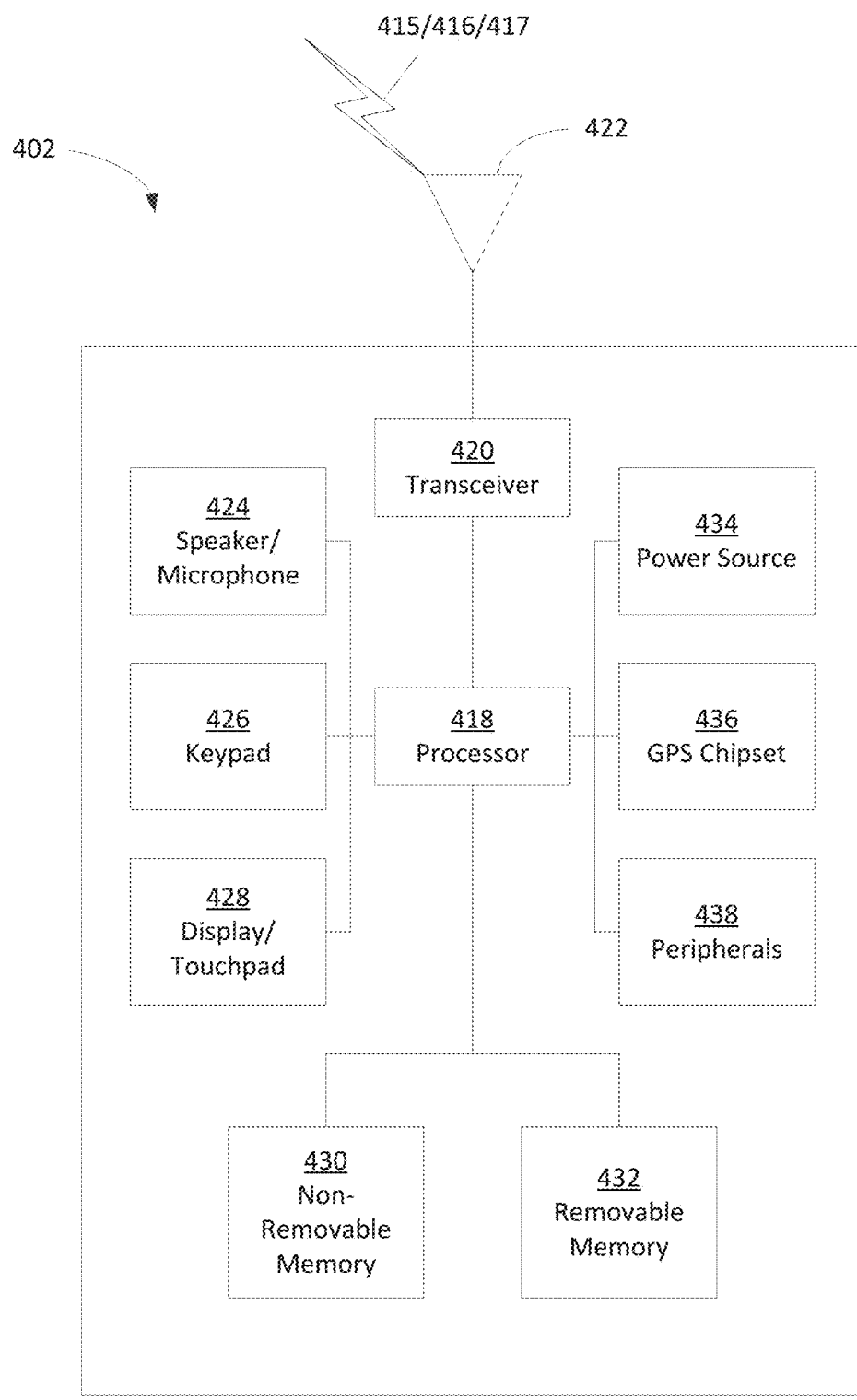
FIG. 4B is a system diagram of an example wireless transmit/receive unit (WTRU) that may be used within the communications system illustrated in FIG. 4A.

FIG. 4B is a system diagram of an example WTRU 402. As shown in FIG. 4B, the WTRU 402 may include a processor 418, a transceiver 420, a transmit/receive element 422, a speaker/microphone 424, a keypad 426, a display/touchpad 428, non-removable memory 430, removable memory 432, a power source 434, a global positioning system (GPS) chipset 436, and other peripherals 438. It will be appreciated that the WTRU 402 may include any subcombination of the foregoing elements while remaining consistent with an embodiment. Also, embodiments contemplate that the base stations 414a and 414b, and/or the nodes that base stations 414a and 414b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 4B and described herein.

The processor 418 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 418 may perform signal coding, data processing, power control, input/output processing, and/or any other functionality that enables the WTRU 402 to operate in a wireless environment. The processor 418 may be coupled to the transceiver 420, which may be coupled to the transmit/receive element 422. While FIG. 4B depicts the processor 418 and the transceiver 420 as separate components, it will be appreciated that the processor 418 and the transceiver 420 may be integrated together in an electronic package or chip.

The transmit/receive element 422 may be configured to transmit signals to, or receive signals from, a base station (e.g., the base station 414a) over the air interface 415/416/417. For example, in one embodiment, the transmit/receive element 422 may be an antenna configured to transmit and/or receive RF signals. In another embodiment, the transmit/receive element 422 may be an emitter/detector configured to transmit and/or receive IR, UV, or visible light signals, for example. In yet another embodiment, the transmit/receive element 422 may be configured to transmit and receive both RF and light signals. It will be appreciated that the transmit/receive element 422 may be configured to transmit and/or receive any combination of wireless signals.

In addition, although the transmit/receive element 422 is depicted in FIG. 4B as a single element, the WTRU 402 may include any number of transmit/receive elements 422. More specifically, the WTRU 402 may employ MIMO technology. Thus, in one embodiment, the WTRU 402 may include two or more transmit/receive elements 422 (e.g., multiple antennas) for transmitting and receiving wireless signals over the air interface 415/416/417.

The transceiver 420 may be configured to modulate the signals that are to be transmitted by the transmit/receive element 422 and to demodulate the signals that are received by the transmit/receive element 422. As noted above, the WTRU 402 may have multi-mode capabilities. Thus, the transceiver 420 may include multiple transceivers for enabling the WTRU 402 to communicate via multiple RATs, such as UTRA and IEEE 802.11, for example.

The processor 418 of the WTRU 402 may be coupled to, and may receive user input data from, the speaker/microphone 424, the keypad 426, and/or the display/touchpad 428 (e a liquid crystal display (LCD) display unit or organic light-emitting diode (OLED) display unit). The processor 418 may also output user data to the speaker/microphone 424, the keypad 426, and/or the display/touchpad 428. In addition, the processor 418 may access information from, and store data in, any type of suitable memory, such as the non-removable memory 430 and/or the removable memory 432. The non-removable memory 430 may include random-access memory (RAM), read-only memory (ROM), a hard disk, or any other type of memory storage device. The removable memory 432 may include a subscriber identity module (SIM) card, a memory stick, a secure digital (SD) memory card, and the like. In other embodiments, the processor 418 may access information from, and store data in, memory that is not physically located on the WTRU 402, such as on a server or a home computer (not shown).

The processor 418 may receive power from the power source 434, and may be configured to distribute and/or control the power to the other components in the WTRU 402. The power source 434 may be any suitable device for powering the WTRU 402. For example, the power source 434 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 418 may also be coupled to the GPS chipset 436, which may be configured to provide location information (e.g., longitude and latitude) regarding the current location of the WTRU 402. In addition to, or in lieu of, the information from the GPS chipset 436, the WTRU 402 may receive location information over the air interface 415/416/417 from a base station (e.g., base stations 414a, 414b) and/or determine its location based on the timing of the signals being received from two or more nearby base stations. It will be appreciated that the WTRU 402 may acquire location information by way of any suitable location-determination method while remaining consistent with an embodiment.

The processor 418 may further be coupled to other peripherals 438, which may include one or more software and/or hardware modules that provide additional features, functionality and/or wired or wireless connectivity. For example, the peripherals 438 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 4C:
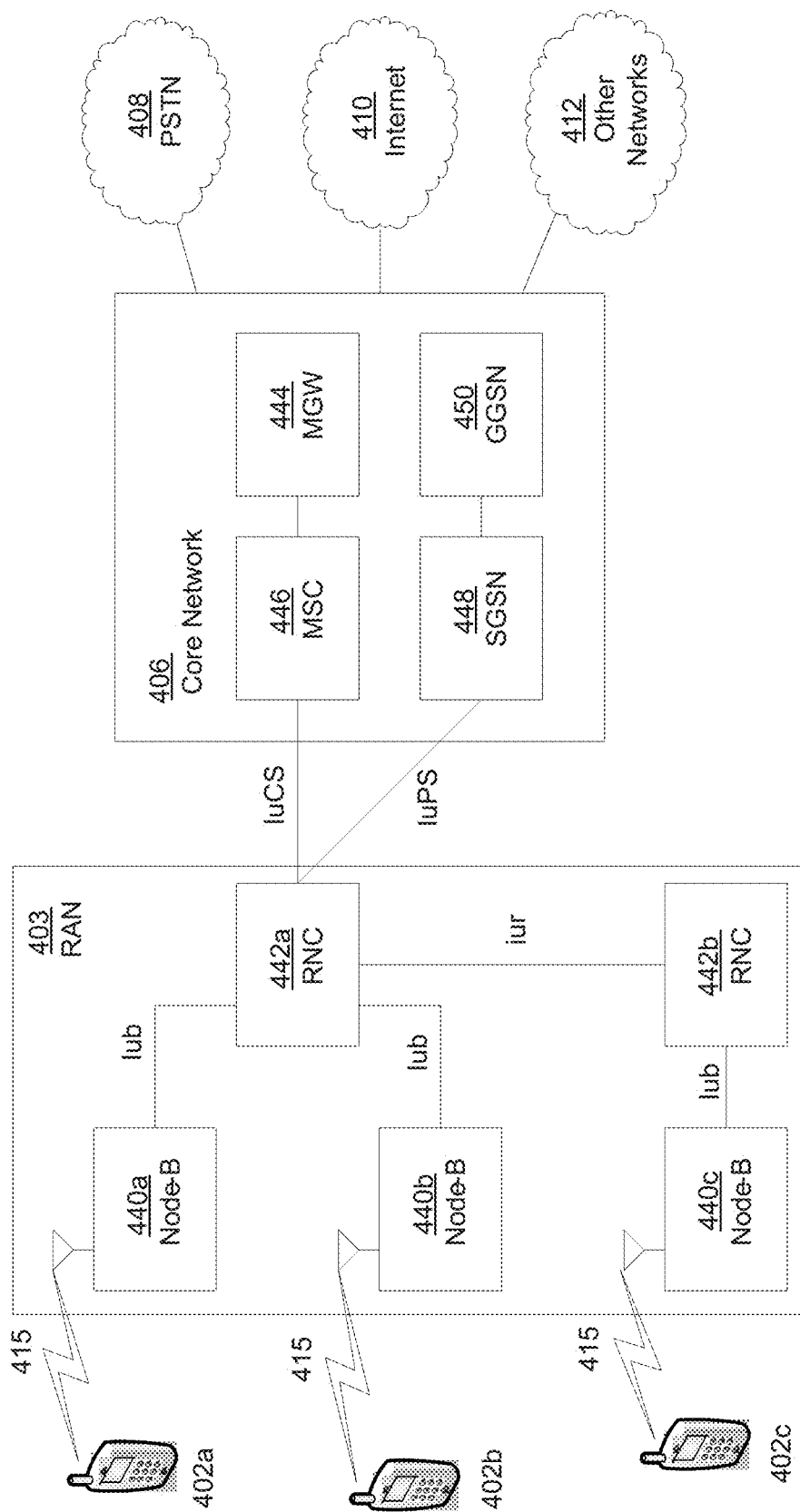
FIG. 4C is a system diagram of an example radio access network and an example core network that may be used within the communications system illustrated in FIG. 4A.

FIG. 4C is a system diagram of the RAN 403 and the core network 406 according to an embodiment. As noted above, the RAN 403 may employ a UTRA radio technology to communicate with the WTRUs 402a, 402b, 402c over the air interface 415. The RAN 404 may also be in communication with the core network 406. As shown in FIG. 4C, the RAN 403 may include Node-Bs 440a, 440b, 440c, which may each include one or more transceivers for communicating with the WTRUs 402a, 402b, 402c over the air interface 415. The Node-Bs 440a, 440b, 440c may each be associated with a particular cell (not shown) within the RAN 403, The RAN 403 may also include RNCs 442a, 442b. It will be appreciated that the RAN 403 may include any number of Node-Bs and RNCs while remaining consistent with an embodiment.

As shown in FIG. 4C, the Node-Bs 440a, 440b may be in communication with the RNC 442a, Additionally, the Node-B 440c may be in communication with the RNC 442b, The Node-Bs 440a, 440b, 440c may communicate with the respective RNCs 442a, 442b via an Iub interface. The RNCs 442a, 442b may be in communication with one another via an Iur interface. Each of the RNCs 442a, 442b may be configured to control the respective Node-Bs 440a, 440b, 440c to which it is connected. In addition, each of the RNCs 442a, 442b may be configured to carry out or support other functionality, such as outer loop power control, load control, admission control, packet scheduling, handover control, macrodiversity, security functions, data encryption, and the like.

The core network 406 shown in FIG. 4C may include a media gateway (MGW) 444, a mobile switching center (MSC) 446, a serving GPRS support node (SGSN) 448, and/or a gateway GPRS support node (GGSN) 450. While each of the foregoing elements are depicted as part of the core network 406, it will be appreciated that any one of these elements may be owned and/or operated by an entity other than the core network operator.

The RNC 442a in the RAN 403 may be connected to the MSC 446 in the core network 406 via an IuCS interface. The MSC 446 may be connected to the MGW 444. The MSC 446 and the MGW 444 may provide the WTRUs 402a, 402b, 402c with access to circuit-switched networks, such as the PSTN 408, to facilitate communications between the WTRUs 402a, 402b, 402c and traditional land-line communications devices.

The RNC 442a in the RAN 403 may also be connected to the SGSN 448 in the core network 406 via an IuPS interface. The SGSN 448 may be connected to the GGSN 450. The SGSN 448 and the GGSN 450 may provide the WTRUs 402a, 402b, 402c with access to packet-switched networks, such as the Internet 410, to facilitate communications between and the WTRUs 402a, 402b, 402c and IP-enabled devices.

As noted above, the core network 406 may also be connected to the networks 412, which may include other wired or wireless networks that are owned and/or operated by other service providers.

Figure 4D:
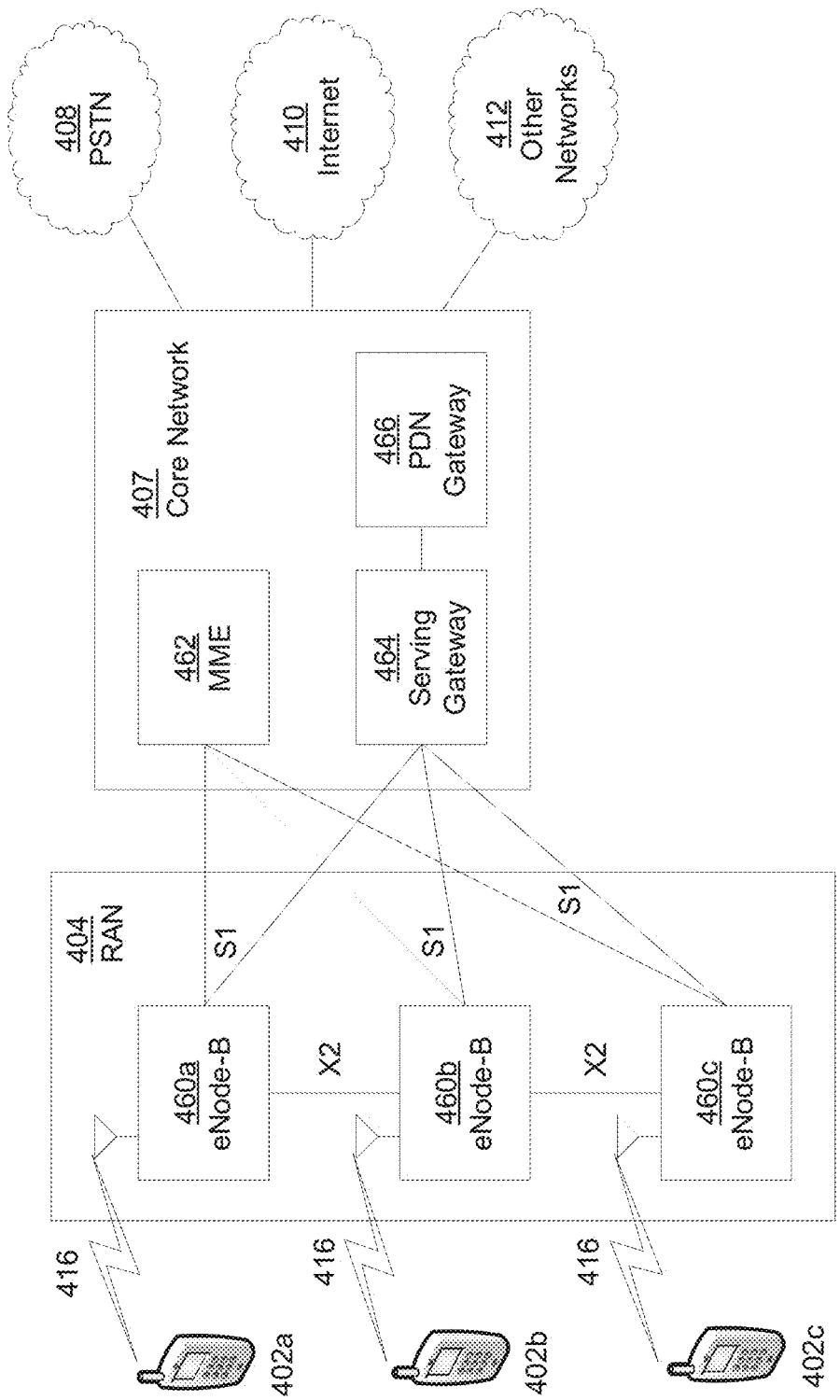
FIG. 4D is a system diagram of another example radio access network and another example core network that may be used within the communications system illustrated in FIG. 4A.

FIG. 4D is a system diagram of the RAN 404 and the core network 407 according to another embodiment. As noted above, the RAN 404 may employ an E-UTRA radio technology to communicate with the WTRUs 402a, 402b, 402c over the air interface 416. The RAN 404 may also be in communication with the core network 407.

The RAN 404 may include eNode-Bs 460a, 460b, 460c, though it will be appreciated that the RAN 404 may include any number of eNode-Bs while remaining consistent with an embodiment. The eNode-Bs 460a, 460b, 460c may each include one or more transceivers for communicating with the WTRUs 402a, 402b, 402c over the air interface 416. In one embodiment, the eNode-Bs 460a, 460b, 460c may implement MIMO technology. Thus, the eNode-B 460a, for example, may use multiple antennas to transmit wireless signals to, and receive wireless signals from, the WTRU 402a.

Each of the eNode-Bs 460a, 460b, 460c may be associated with a particular cell (not shown) and may be configured to handle radio resource management decisions, handover decisions, scheduling of users in the uplink and/or downlink, and the like. As shown in FIG. 4D, the eNode-Bs 460a, 460b, 460c may communicate with one another over an X2 interface.

The core network 407 shown in FIG. 4D may include a mobility management gateway (MME) 462, a serving gateway 464, and a packet data network (PDN) gateway 466. While each of the foregoing elements are depicted as part of the core network 407, it will be appreciated that any one of these elements may be owned and/or operated by an entity other than the core network operator.

The MME 462 may be connected to each of the eNode-Bs 460a, 460b, 460c in the RAN 404 via an S1 interface and may serve as a control node. For example, the MME 462 may be responsible for authenticating users of the WTRUs 402a, 402b, 402c, bearer activation/deactivation, selecting a particular serving gateway during an initial attach of the WTRUs 402a, 402b, 402c, and the like. The MIME 462 may also provide a control plane function for switching between the RAN 404 and other RANs (not shown) that employ other radio technologies, such as GSM or WCDMA.

The serving gateway 464 may be connected to each of the eNode Bs 460a, 460b, 460c in the RAN 404 via the S1 interface. The serving gateway 464 may generally route and forward user data packets to/from the WTRUs 402a, 402b, 402c. The serving gateway 464 may also perform other functions, such as anchoring user planes during inter-eNode B handovers, triggering paging when downlink data is available for the WTRUs 402a, 402b, 402c, managing and storing contexts of the WTRUs 402a, 402b, 402c, and the like.

The serving gateway 464 may also be connected to the PDN gateway 466, which may provide the WTRUs 402a, 402b, 402c with access to packet-switched networks, such as the Internet 410, to facilitate communications between the WTRUs 402a, 402b, 402c and IP-enabled devices.

The core network 407 may facilitate communications with other networks. For example, the core network 407 may provide the WTRUs 402a, 402b, 402c with access to circuit-switched networks, such as the PSTN 408, to facilitate communications between the WTRUs 402a, 402b, 402c and traditional land-line communications devices. For example, the core network 407 may include, or may communicate with, an IP gateway (e.g., an IP multimedia subsystem (IMS) server) that serves as an interface between the core network 407 and the PSTN 408. In addition, the core network 407 may provide the WTRUs 402a, 402b, 402c with access to the networks 412, which may include other wired or wireless networks that are owned and/or operated by other service providers.

Figure 4E:
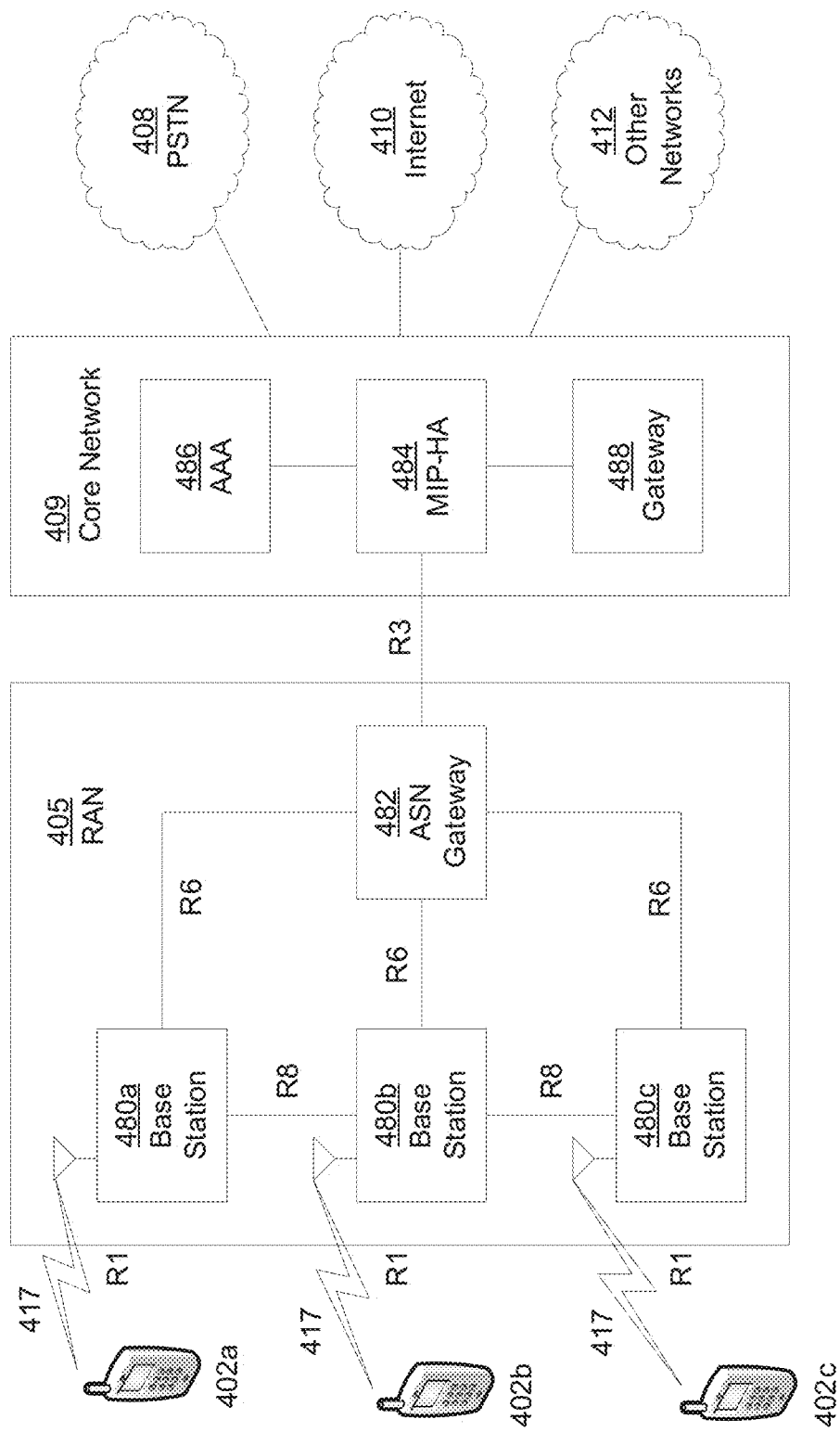
FIG. 4E is a system diagram of another example radio access network and another example core network that may be used within the communications system illustrated in FIG. 4A.

FIG. 4E is a system diagram of the RAN 405 and the core network 409 according to another embodiment. The RAN 405 may be an access service network (ASN) that employs IEEE 802.16 radio technology to communicate with the WTRUs 402a, 402b, 402c over the air interface 417. As will be further discussed below, the communication links between the different functional entities of the WTRUs 402a, 402b, 402c, the RAN 405, and the core network 409 may be defined as reference points.

As shown in FIG. 4E, the RAN 405 may include base stations 480a, 480b, 480c, and an ASN gateway 482, though it will be appreciated that the RAN 405 may include any number of base stations and ASN gateways while remaining consistent with an embodiment. The base stations 480a, 480b, 480c may each be associated with a particular cell (not shown) in the RAN 405 and may each include one or more transceivers for communicating with the WTRUs 402a, 402b, 402c over the air interface 417. In one embodiment, the base stations 480a, 480b, 480c may implement MIMO technology. Thus, the base station 480a, for example, may use multiple antennas to transmit wireless signals to, and receive wireless signals from, the WTRU 402a. The base stations 480a, 480b, 480c may also provide mobility management functions, such as handoff triggering, tunnel establishment, radio resource management, traffic classification, quality of service (QoS) policy enforcement, and the like. The ASN gateway 482 may serve as a traffic aggregation point and may be responsible for paging, caching of subscriber profiles, routing to the core network 409, and the like.

The air interface 417 between the WTRUs 402a, 402b, 402c and the RAN 405 may be defined as an R8 reference point that implements the IEEE 802.16 specification. In addition, each of the WTRUs 402a, 402b, 402c may establish a logical interface (not shown) with the core network 409. The logical interface between the WTRUs 402a, 402b, 402c and the core network 409 may be defined as an R2 reference point, which may be used for authentication, authorization, IP host configuration management, and/or mobility management.

The communication link between each of the base stations 480a, 480b, 480c may be defined as an R8 reference point that includes protocols for facilitating WTRU handovers and the transfer of data between base stations. The communication link between the base stations 190a, 480b, 480c and the ASN gateway 482 may be defined as an R6 reference point. The R6 reference point may include protocols for facilitating mobility management based on mobility events associated with each of the WTRUs 402a, 402b, 402c.

As shown in FIG. 4E, the RAN 405 may be connected to the core network 409. The communication link between the RAN 405 and the core network 409 may defined as an R3 reference point that includes protocols for facilitating data transfer and mobility management capabilities, for example. The core network 409 may include a mobile IP home agent (MIP-HA) 484, an authentication, authorization, accounting (AAA) server 486, and a gateway 488. While each of the foregoing elements are depicted as part of the core network 409, it will be appreciated that any one of these elements may be owned and/or operated by an entity other than the core network operator.

The MIP-HA 484 may be responsible for IP address management, and may enable the WTRUs 402a, 402b, 402c to roam between different ASNs and/or different core networks. The MIP-HA 484 may provide the WTRUs 402a, 402b, 402c with access to packet-switched networks, such as the Internet 410, to facilitate communications between the WTRUs 402a, 402b, 402c and IP-enabled devices. The AAA server 486 may be responsible for user authentication and for supporting user services. The gateway 488 may facilitate interworking with other networks. For example, the gateway 488 may provide the WTRUs 402a, 402b, 402c with access to circuit-switched networks, such as the PSTN 408, to facilitate communications between the WTRUs 402a, 402b, 402c and traditional land-line communications devices. In addition, the gateway 488 may provide the WTRUs 402a, 402b, 402c with access to the networks 412, which may include other wired or wireless networks that are owned and/or operated by other service providers.

Although not shown in FIG. 4E, it will be appreciated that the RAN 405 may be connected to other ASNs and the core network 409 may be connected to other core networks. The communication link between the RAN 405 the other ASNs may be defined as an R4 reference point, which may include protocols for coordinating the mobility of the WTRUs 402a, 402b, 402c between the RAN 405 and the other ASNs. The communication link between the core network 409 and the other core networks may be defined as an R5 reference, which may include protocols for facilitating interworking between home core networks and visited core networks.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A method comprising:
receiving a bitstream comprising a base layer bitstream and an enhancement layer bitstream, the base layer bitstream and the enhancement layer bitstream being encoded according to different video compression formats;
receiving prediction information in the enhancement layer bitstream that identifies a temporal reference picture structure of the base layer bitstream;
determining one or more reference pictures available in a base layer decoded picture buffer (DPB) using the prediction information from the enhancement layer bitstream; and
decoding at least one enhancement layer picture of the enhancement layer bitstream using the prediction information.

2. The method of claim 1, wherein the base layer bitstream is encoded according to H.264/AVC and the enhancement layer bitstream is encoded according to HEVC.

3. The method of claim 1, wherein the base layer bitstream is encoded according to HEVC.

4. The method of claim 1, wherein the prediction information is signaled via a sequence parameter set (SPS), a video parameter set (VPS), or an adaptive parameter set (APS) of the enhancement layer bitstream.

5. The method of claim 1, further comprising:
decoding a plurality of enhancement layer pictures of the enhancement layer bitstream using the temporal reference picture structure of the base layer bitstream that is identified by the prediction information from the enhancement layer bitstream.

6. The method of claim 1, wherein the prediction information identifies the ordering and the positions of the one or more reference pictures available in the base layer DPB.

7. The method of claim 1, wherein decoding at least one enhancement layer picture of the enhancement layer bitstream using the prediction information comprises performing inter-layer prediction using at least one of a co-located base layer reference picture and a non-co-located base layer reference picture identified by the prediction information.

8. The method of claim 1, wherein the prediction information indicates that a base layer picture has a reference picture set (RPS) temporal prediction structure of a collocated enhancement layer picture.

9. The method of claim 1, wherein the bitstream comprises a constraint on a group of pictures (GOP) of the bitstream, the constraint being that the enhancement layer bitstream has a GOP length of the base layer bitstream or that the enhancement layer bitstream has a GOP temporal prediction structure of the base layer bitstream.

10. The method of claim 1, further comprising calculating a delta picture order count (POC) between a decoded base layer picture and one or more reference pictures available in a base layer DPB for the decoded base layer picture.

11. A device comprising:
a processor configured to:
receive a bitstream comprising a base layer bitstream and an enhancement layer bitstream, the base layer bitstream and the enhancement layer bitstream being encoded according to different video compression formats;
receive prediction information in the enhancement layer bitstream that identifies a temporal reference picture structure of the base layer bitstream;
determine one or more reference pictures available in a base layer decoded picture buffer (DPB) using the prediction information from the enhancement layer bitstream; and
decode at least one enhancement layer picture of the enhancement layer bitstream using the prediction information.

12. The device of claim 11, wherein the base layer bitstream is encoded according to H.264/AVC and the enhancement layer bitstream is encoded according to HEVC.

13. The device of claim 11, wherein the base layer bitstream is encoded according to HEVC.

14. The device of claim 11, wherein the prediction information is signaled via a sequence parameter set (SPS), a video parameter set (VPS), or an adaptive parameter set (APS) of the enhancement layer bitstream.

15. The device of claim 11, wherein the processor is further configured to decode a plurality of enhancement layer pictures of the enhancement layer bitstream using the temporal reference picture structure of the base layer bitstream that is identified by the prediction information from the enhancement layer bitstream.

16. The device of claim 11, wherein the prediction information identifies the ordering and the positions of the one or more reference pictures available in the base layer DPB.

17. The device of claim 11, wherein the configured to decode at least one enhancement layer picture of the enhancement layer bitstream using the prediction information comprises the processor configured to perform inter-layer prediction using a co-located base layer reference picture and a non-co-located base layer reference picture.

18. The device of claim 11, wherein the prediction information indicates that a base layer picture has a reference picture set (RPS) temporal prediction structure of a collocated enhancement layer picture.

19. The device of claim 11, wherein the bitstream comprises a constraint on a group of pictures (GOP) of the bitstream, and wherein the constraint is that the enhancement layer bitstream has a GOP length of the base layer bitstream or that the enhancement layer bitstream has a GOP temporal prediction structure of the base layer bitstream.

20. The device of claim 11, wherein the processor is further configured to calculate a delta picture order count (POC) between a decoded base layer picture and one or more reference pictures available in a base layer DPB for the decoded base layer picture.

\* \* \* \* \*